United States Patent Office 2,955,836
Patented Oct. 11, 1960

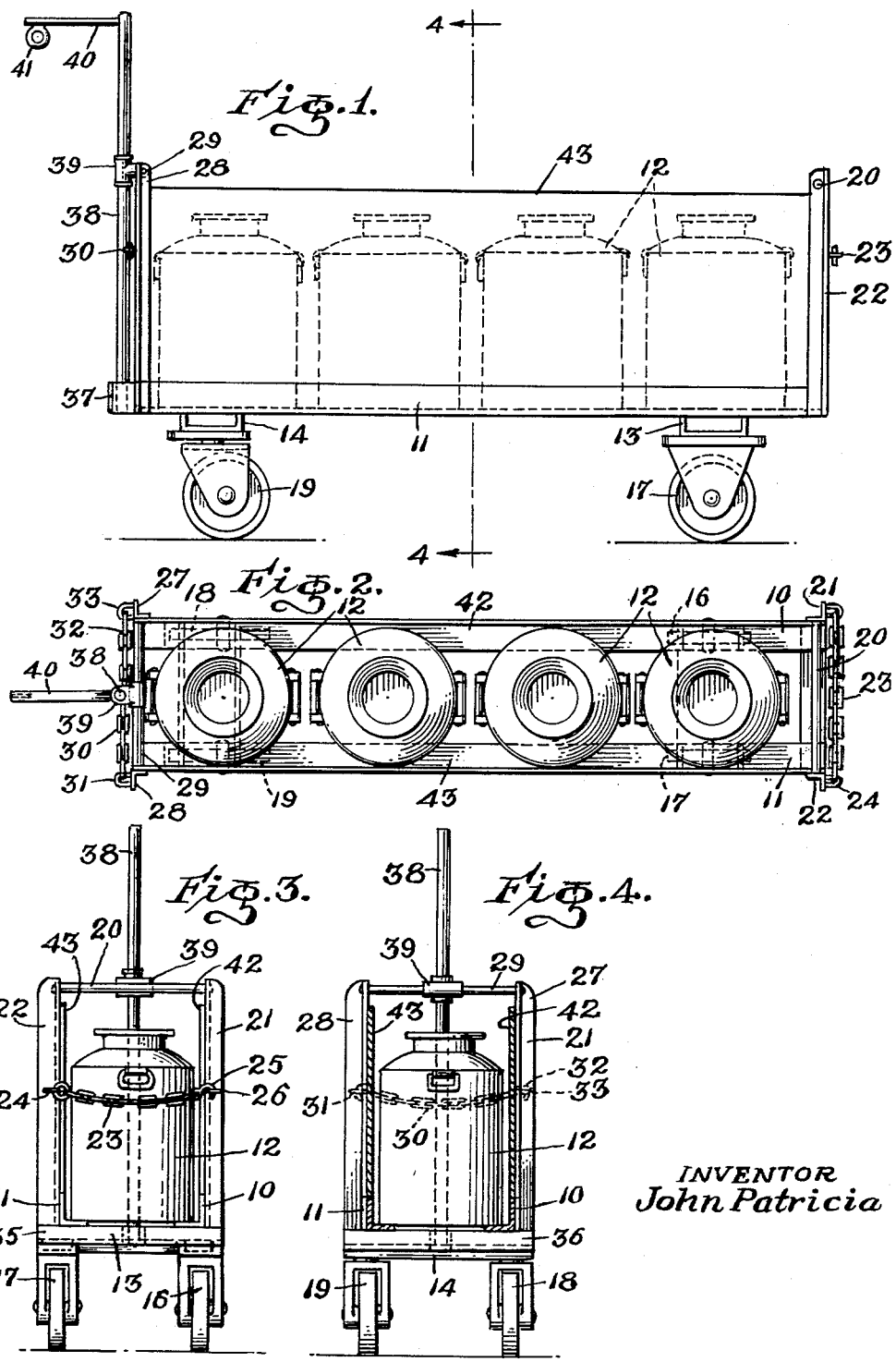

2,955,836
SANITARY MILK CART
John Patricia, Rte. 23, Sussex, N.J.
Filed Jan. 7, 1959, Ser. No. 785,344
1 Claim. (Cl. 280—47.34)

This invention relates to a sanitary milk can cart.

It is the principal object of the present invention to provide a cart that will conveniently support milk cans so that they may be taken to the barn where the milk can be poured and strained and to eliminate the need for carrying the milk in pails to a milk house often far removed from the barn.

It is another object of the invention to provide a milk can truck that can be formed of stainless steel welded together so as to render it sanitary for supporting the milk cans.

It is still another object of the invention to provide a milk can truck which may have a milk weighing boom removably secured to one end of the cart and by which the pails of milk can be weighted before their contents are poured into the cans already in the truck.

It is a further object of the invention to provide a cart in which the ends are open and the sides are fully closed to prevent manure and dirt from being flung against the sides of the cans, the cans being removably and slidable through and from the ends of the cart.

Other objects of the invention are to provide a milk can cart having the above objects in mind, which is of simple construction, has a minimum number of parts, inexpensive to manufacture, easy to push and pull, of pleasing appearance, effective and efficient in use.

For a better understanding of the invention, reference may be had to the following detailed description taken in connection with the accompanying drawing, in which—

Figure 1 is a side elevational view of the milk cart embodying the features of the present invention and with the milk cans therein, Fig. 2 is a top plan view, Fig. 3 is an elevational view of the front and boom end of the cart, and Fig. 4 is a vertical sectional view of the cart taken on line 4—4 of Fig. 1.

Referring now to figures, 10 and 11 represent respectively opposed internal runners on which the bottoms of the milk cans 12 are supported. At the underside of these members and adapted to hold the same in spaced relationship and secure with one another are transversely-extending front and rear spaced members 13 and 14, and to support the forward end of the cart are two fixed wheels 16 and 17. On the rear of the cart are two caster wheels 18 and 19. These wheels are laterally spaced from each other and provided in pairs. By the use of the caster wheels the cart can be steered.

Extending upwardly at the front of the cart and secured to the outer sides of the longitudinal angle pieces 10 and 11 are upstanding supports 21 and 22 of angle section. These supports have their upper ends at a height substantially greater than the height of the milk cans 12. A horizontally disposed bar or rod 20 (Figures 1 to 3) extends between the upper ends of the supports 21 and 22 and is therefore at a height great enough to permit the milk cans to be inserted thereunder. These angle pieces 21 and 22 are braced at their upper ends with a chain 23 secured to a loop 24 through a hook 25 by which it can be releasably secured to an eye 26. In this way the cans are kept from sliding from the front of the cart.

Extending upwardly from the outer sides of the longitudinal members 10 and 11 at the rear of the cart are upstanding supports 27 and 28 of angle section that are tied together at their upper ends by the rod 29, which is also sufficiently high to permit the cans 12 to be removed from or inserted into the cart. A chain 30 is secured by a loop 31 to the support 28 and is secured by its hook 32 to the eye 33 on the support 27.

The front ends on the longitudinal pieces 10 and 11 are tied together at the front end by the transverse member 35 and the members 10 and 11 are tied together at the rear ends by a transverse member 36. The transverse member 36 has a bearing support 37 for a vertically-extending boom rod 38 that extends upwardly through a sleeve 39 secured to the transverse top rod 29. This rod 38 has a laterally-extending boom 40 with a depending eye 41 into which a hook can be extended from the weighing scales so that the pails of milk can be weighed before being strained and poured into the milk cans 12.

The sides of the cart are closed by sheet metal side pieces 42 and 43 which extend between and are secured to, respectively, the supports 21, 27 and 22, 28. These sheets cover both sides of the cart so that milk cans cannot get splattered with cow manure. All of the parts of this cart are preferably made of stainless steel so they can be easily cleaned and the entire cart always kept in a sanitary condition.

It should thus now be apparent that there has been provided a milk cart that can be taken into the barn and used for supporting the milk cans into which the milk from pails is poured and strained.

While various changes may be made in the detailed construction, it shall be understood that such changes shall be within the spirit and scope of the present invention as defined by the appended claim.

What is claimed is:

A milk can cart, comprising, in combination, two longitudinally extending angle members spaced horizontally from each other and in parallel relationship such that horizontal portions of said angle members extend inwardly toward each other to provide horizontal slides for slidably engaging beneath outer base rim portions of milk cans and providing sole support therefore, transverse channel iron members extending beneath forward and rear ends of said angle members, rigidly guided wheels secured beneath the ends of said forward transverse channel iron member and swivel wheels connected beneath said rear channel iron member, vertical supports extending upwardly from each end of the outersides of the longitudinally extending angle members, said vertical supports extending above the level of the tops of said milk cans, transverse members securing the upper ends of the vertical supports, sheet metal shields extending along the sides of the cart and secured to the vertical supports and the outer sides of said angle members and adapted to completely shield each side of the cart, a bearing support at the rear of the cart, a sleeve bearing secured to one of said transverse members in a vertical manner above said bearing support, a boom rod extending upwardly from the bearing support and through the sleeve bearing and terminating in a horizontally projecting arm, said arm being adapted to receive weighing scales by which pails of milk can be weighed.

References Cited in the file of this patent
UNITED STATES PATENTS

| | | |
|---|---|---|
| 845,673 | Varrmanen et al. | Feb. 26, 1907 |
| 1,103,689 | Russell | July 14, 1914 |
| 1,150,082 | Verplanck | Aug. 17, 1915 |
| 1,171,486 | Warner | Feb. 15, 1916 |
| 1,176,978 | Parker | Mar. 28, 1916 |
| 1,498,210 | Smith | June 17, 1924 |
| 2,560,059 | Young | July 10, 1951 |
| 2,799,409 | Kelly | July 16, 1957 |